(12) United States Patent
Olivieri et al.

(10) Patent No.: US 9,290,047 B2
(45) Date of Patent: Mar. 22, 2016

(54) LIGHTWEIGHT HUB UNIT WITH INTEGRATED BEARING RINGS AND PROCESSES FOR ITS MANUFACTURE

(71) Applicants: Davide Antonio Olivieri, Turin (IT); Jan Arie Pieter van Riet, Hyssna (SE); Laura Sguotti, Bosco Marengo (IT)

(72) Inventors: Davide Antonio Olivieri, Turin (IT); Jan Arie Pieter van Riet, Hyssna (SE); Laura Sguotti, Bosco Marengo (IT)

(73) Assignee: AKTIEBOLAGET SKF, Gothenburg (SE)

( * ) Notice: Subject to any disclaimer, the term of this patent is extended or adjusted under 35 U.S.C. 154(b) by 140 days.

(21) Appl. No.: 14/154,153

(22) Filed: Jan. 13, 2014

(65) Prior Publication Data

US 2014/0197678 A1 Jul. 17, 2014

(30) Foreign Application Priority Data

Jan. 11, 2013 (IT) .............................. TO2013A0027

(51) Int. Cl.
*B60B 27/02* (2006.01)
*B60B 27/00* (2006.01)
*F16C 33/60* (2006.01)
*F16C 33/62* (2006.01)
*F16C 33/64* (2006.01)
*B60B 27/06* (2006.01)
*F16C 35/073* (2006.01)

(52) U.S. Cl.
CPC ......... *B60B 27/0078* (2013.01); *B60B 27/0084* (2013.01); *F16C 33/60* (2013.01); *F16C 33/62* (2013.01); *F16C 33/64* (2013.01); *B60B 27/06* (2013.01); *B60B 2310/3142* (2013.01); *B60B 2360/104* (2013.01); *B60B 2360/34* (2013.01); *B60B 2360/36* (2013.01); *B60B 2380/73* (2013.01); *B60B 2380/82* (2013.01); *B60B 2900/111* (2013.01); *B60Y 2200/10* (2013.01); *F16C 35/073* (2013.01); *F16C 2326/02* (2013.01); *Y10T 29/49492* (2015.01)

(58) Field of Classification Search
CPC ......................... B60B 27/0005; B60B 27/001
USPC ...................................... 301/5.309, 109, 110
See application file for complete search history.

(56) References Cited

U.S. PATENT DOCUMENTS

| | | | | | |
|---|---|---|---|---|---|
| 4,473,129 | A | * | 9/1984 | Guimbretiere | ...... B60B 27/0005 180/254 |
| 5,100,217 | A | * | 3/1992 | Mahnig | ............... B60B 27/0005 384/536 |
| 5,725,285 | A | * | 3/1998 | Niebling | ............. B60B 27/0005 301/105.1 |
| 5,764,049 | A | * | 6/1998 | Hofmann | ............ B60B 27/0005 324/173 |
| 5,782,566 | A | * | 7/1998 | Bertetti | ............... B60B 27/0005 384/537 |

(Continued)

*Primary Examiner* — Jeffrey J Restifo
(74) *Attorney, Agent, or Firm* — Bryan Peckjian; SKF USA Inc. Patent Dept.

(57) ABSTRACT

A hub unit includes a hub of light material forming a cylindrical portion, a flange and a radial recess having a surface facing the flange, and two bearing rings axially aligned around the cylindrical portion of the hub; a sleeve locking device is radially interposed between the cylindrical portion of the hub and the bearing rings, and comprises a retaining portion engaged in the radial recess of the hub, a terminal edge which preloads the bearing rings, and one or two cuts extending in an axial direction.

21 Claims, 6 Drawing Sheets

(56) References Cited

U.S. PATENT DOCUMENTS

| | | | | |
|---|---|---|---|---|
| 5,983,482 A * | 11/1999 | Kawatani | B23P 13/02 | 279/137 |
| 5,984,422 A * | 11/1999 | Seifert | B60B 27/001 | 192/69.1 |
| 6,037,766 A * | 3/2000 | Goossens | B60B 27/0005 | 324/173 |
| 6,099,167 A * | 8/2000 | Goto | B60B 27/0005 | 301/105.1 |
| 6,112,411 A * | 9/2000 | Rutter | B60B 27/00 | 29/525 |
| 6,161,963 A * | 12/2000 | Doell | B60B 27/00 | 384/541 |
| 6,170,919 B1 * | 1/2001 | Hofmann | B60B 27/0005 | 301/105.1 |
| 6,443,622 B1 * | 9/2002 | Webb | B23P 11/00 | 384/448 |
| 6,464,399 B1 * | 10/2002 | Novak, Jr. | B60B 27/00 | 301/105.1 |
| 8,302,309 B2 * | 11/2012 | Hirai | B21K 1/40 | 188/18 A |
| 2006/0215948 A1 * | 9/2006 | Bosco | B60B 27/00 | 384/544 |
| 2006/0257063 A1 * | 11/2006 | Shigeoka | B60B 27/0005 | 384/544 |
| 2007/0135220 A1 * | 6/2007 | Welschof | B60B 27/00 | 464/140 |
| 2007/0201783 A1 * | 8/2007 | Hirai | B60B 27/0005 | 384/544 |
| 2007/0217728 A1 * | 9/2007 | Kashiwagi | B60B 27/001 | 384/544 |
| 2007/0230850 A1 * | 10/2007 | Seo | B60B 27/0005 | 384/544 |
| 2007/0230853 A1 * | 10/2007 | Inoue | B60B 27/001 | 384/589 |
| 2008/0093914 A1 * | 4/2008 | Mabuchi | B60B 3/04 | 301/105.1 |
| 2008/0144985 A1 * | 6/2008 | Joki | B60B 3/04 | 384/448 |
| 2008/0205810 A1 * | 8/2008 | Maeda | B60B 27/001 | 384/544 |
| 2008/0238184 A1 * | 10/2008 | Cermak | B60B 27/00 | 301/110 |
| 2009/0034894 A1 * | 2/2009 | Furukawa | B60B 27/001 | 384/487 |
| 2009/0189436 A1 * | 7/2009 | Hirai | B60B 27/0005 | 301/110 |
| 2009/0208159 A1 * | 8/2009 | Heim | B60B 27/001 | 384/448 |
| 2010/0002972 A1 * | 1/2010 | Ohtsuki | B60B 27/0005 | 384/544 |
| 2010/0021099 A1 * | 1/2010 | Torii | B60B 27/0005 | 384/544 |
| 2010/0054646 A1 * | 3/2010 | Dlugai | B60B 27/0005 | 384/512 |
| 2010/0109424 A1 * | 5/2010 | Inoue | B60B 27/00 | 301/109 |
| 2010/0239202 A1 * | 9/2010 | Kuroda | B21H 1/12 | 384/512 |
| 2010/0301666 A1 * | 12/2010 | Shibata | B60B 27/0005 | 301/109 |
| 2010/0320832 A1 * | 12/2010 | Weigand | B60B 27/001 | 301/110 |
| 2011/0012420 A1 * | 1/2011 | Nakagawa | B60B 27/0005 | 301/110 |
| 2011/0069922 A1 * | 3/2011 | Ravenna | B60B 27/0005 | 384/589 |
| 2011/0129176 A1 * | 6/2011 | Koma | B60B 27/001 | 384/484 |
| 2011/0235957 A1 * | 9/2011 | Vissers | B22D 17/007 | 384/523 |
| 2011/0248555 A1 * | 10/2011 | Werries | B60B 27/0005 | 301/109 |
| 2011/0304197 A1 * | 12/2011 | Norimatsu | B60B 27/00 | 301/110 |
| 2012/0076450 A1 * | 3/2012 | Suma | B60B 27/00 | 384/452 |
| 2013/0127235 A1 * | 5/2013 | Yamamoto | B60B 27/0005 | 301/109 |
| 2013/0147257 A1 * | 6/2013 | van de Sanden | B21D 39/06 | 301/109 |
| 2013/0257005 A1 * | 10/2013 | Schumacher | B60B 27/001 | 280/124.125 |
| 2013/0334870 A1 * | 12/2013 | Ozawa | B60B 27/00 | 301/109 |
| 2013/0342004 A1 * | 12/2013 | Yamauchi | B60B 27/00 | 301/109 |
| 2014/0175862 A1 * | 6/2014 | Anno | B60B 27/0047 | 301/109 |
| 2014/0183932 A1 * | 7/2014 | Song | B60B 27/0015 | 301/110 |
| 2014/0197677 A1 * | 7/2014 | Olivieri | C22C 21/00 | 301/110 |
| 2014/0197678 A1 * | 7/2014 | Olivieri | B60B 27/0078 | 301/110 |
| 2014/0232176 A1 * | 8/2014 | Ravenna | B60B 27/0005 | 301/110 |
| 2015/0054334 A1 * | 2/2015 | Song | F16C 43/04 | 301/110 |
| 2015/0273939 A1 * | 10/2015 | Mochinaga | F16C 19/18 | 301/6.1 |

* cited by examiner

FIG.1
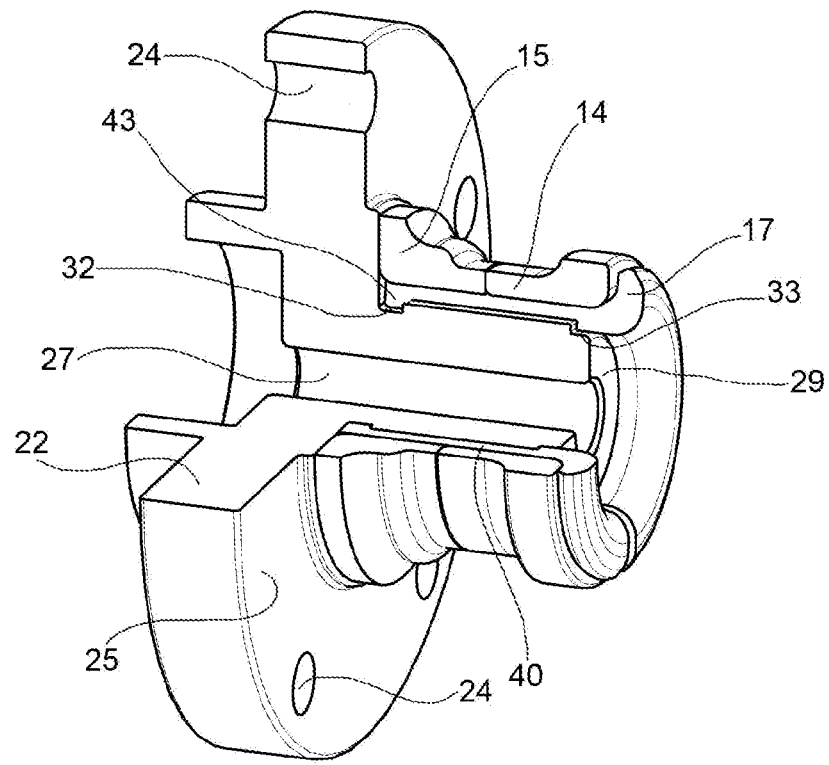
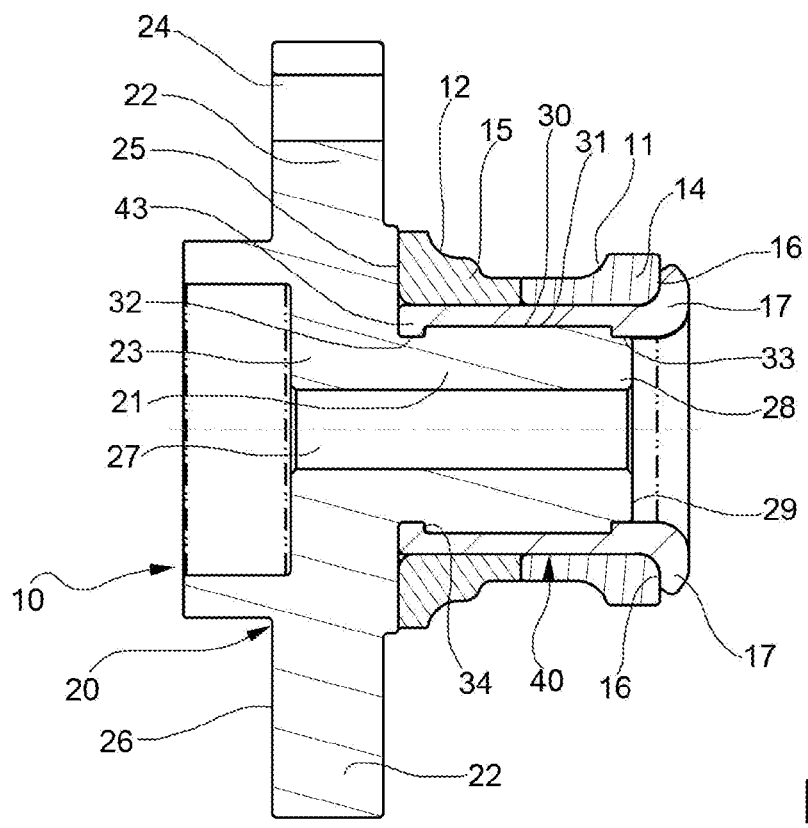
FIG.2

FIG.5
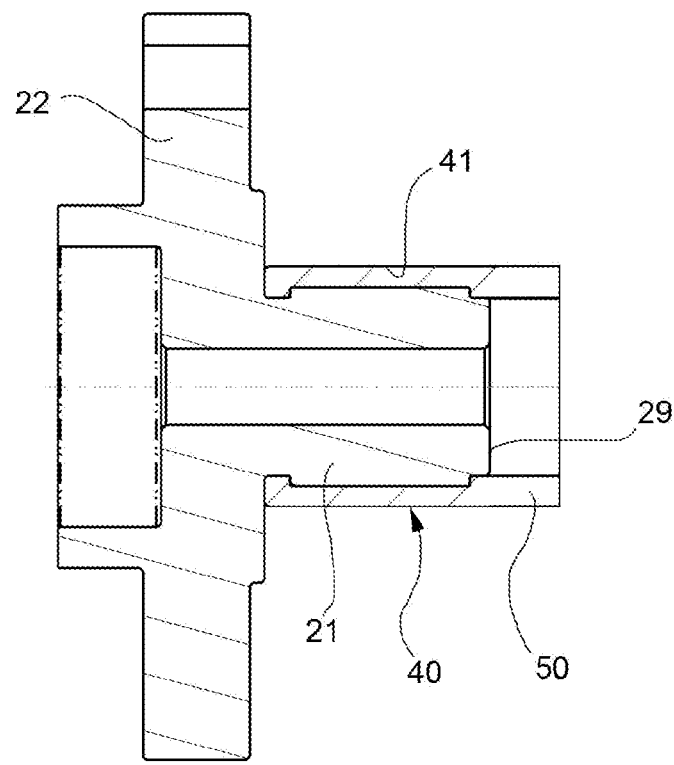
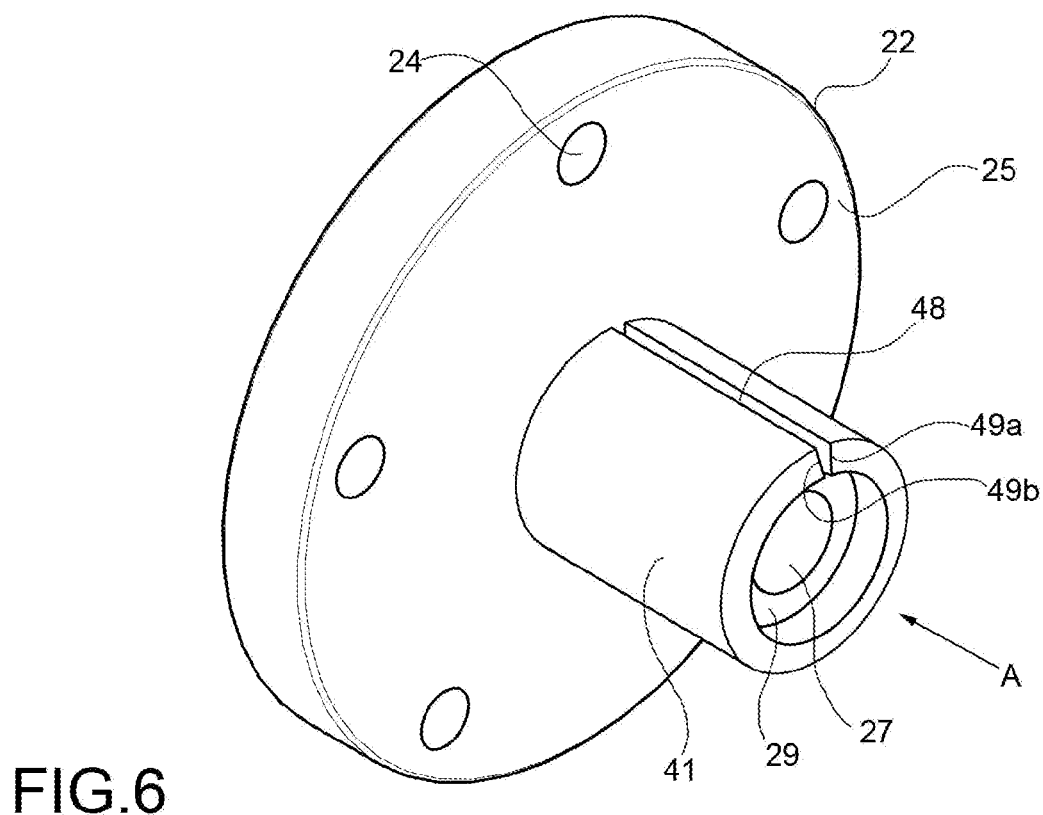
FIG.6

FIG.7
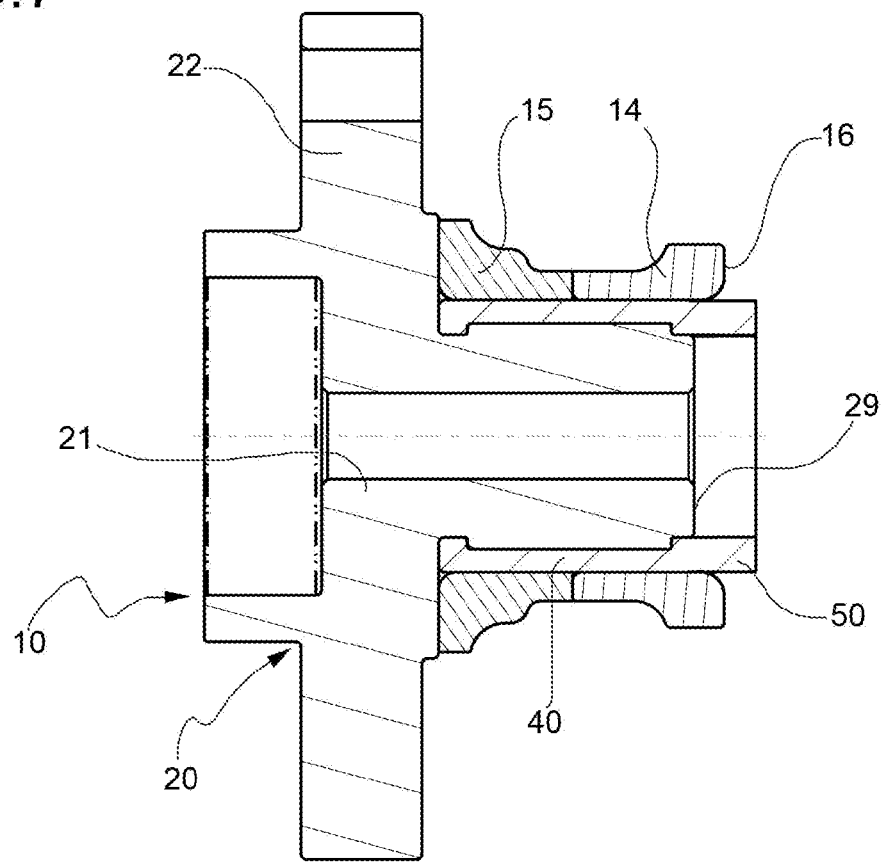
FIG.8
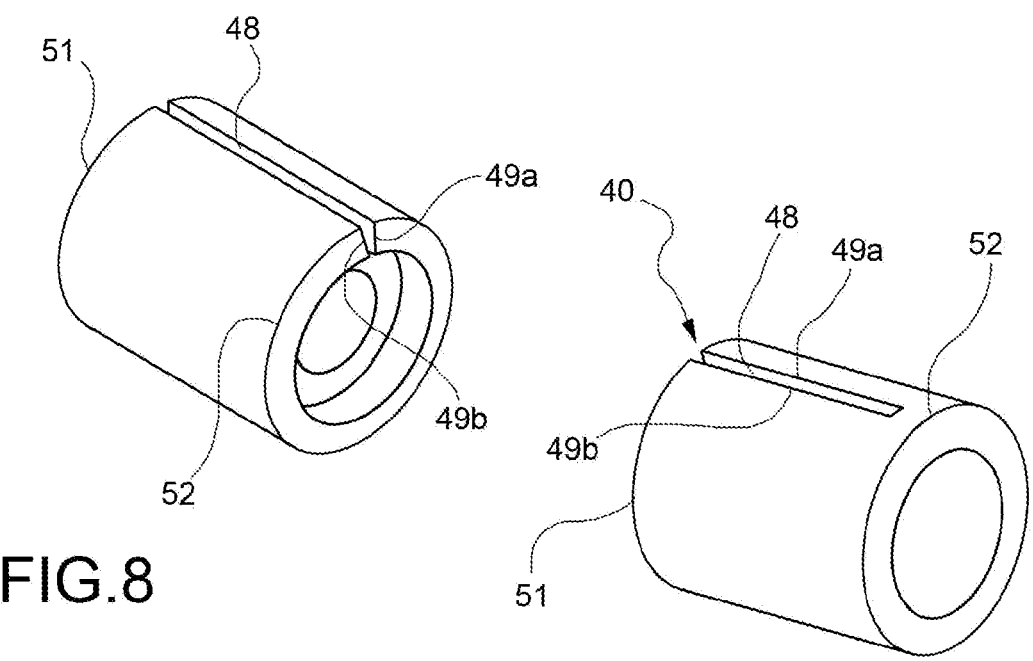
FIG.9

LIGHTWEIGHT HUB UNIT WITH INTEGRATED BEARING RINGS AND PROCESSES FOR ITS MANUFACTURE

CROSS-REFERENCE TO RELATED APPLICATION

This application is a United States Non-Provisional Utility Patent Application claiming the benefit of Italia Patent Application Number TO2013A000027 filed on 11 Jan. 2013, which is incorporated herein in its entirety. It is noted that 11 Jan. 2013 falls on a Saturday; therefore Applicant is afforded until the next business day to maintain co-pendency.

TECHNICAL FIELD

The present invention relates to a lightweight hub unit with integrated bearing rings, for a hub bearing assembly on a motor vehicle wheel. The invention also relates to methods for manufacturing such units.

BACKGROUND ART

In the automotive industry there is an ever increasing demand in terms of reduction of the weight of motor vehicle component parts in order to reduce fuel consumption and exhaust emissions.

In order to reduce the overall weight of the wheel and, in particular of the rotating mass, in recent years hub bearing assemblies have been proposed having a rotating flanged ring made of two different materials, joined together in a single piece. In such rings, a tubular core made of a first material of high toughness, such as steel for bearings, forms the raceways, and a second, light material, such as a light metal, forms the remaining part of the ring, including an outer flange for mounting the wheel. See for example the patent publication WO 2008/147284 A1.

In some cases, the coupling between the steel core and the lighter flange is made by form coupling with interference. These couplings do not always prove to be long-lasting, especially after prolonged use. Indeed, the different coefficients of thermal expansion of steel and aluminium tend to cause the two materials to separate one from the other. In other cases, the coupling is obtained by moulding or casting the light material, for example an aluminium alloy, over the tubular steel core. To avoid or limit movements between the two materials, in rings of this type, the two materials are joined with complexly-shaped interface surfaces, so as to produce undercuts that behave as joints between the two materials. The costs of producing rings using this technology are rather high.

SUMMARY OF THE PRESENT INVENTION

One of the objects of the present invention is to produce a lightweight hub bearing assembly in an economical way, solving the problems of mutual locking between two materials having different weights and thermal expansions. For a bearing of a vehicle wheel, a weight reduction must not result in any reduction in terms of strength and safety.

The raceways must be made of a material hard enough to withstand the Hertzian stresses of the rolling contact. For this reason, traditional steel for bearings is still widely used. The raceways are thermally treated so as to acquire a level of hardness and a homogeneous microstructure able to withstand the stresses caused by Hertzian rolling contacts.

The present invention targets, in particular, hub bearing assemblies having a double-row of rolling elements interposed between respective inner and outer raceways. The two radially outer raceways are both formed by the same outer bearing ring. The two radially inner raceways are formed by two respective annular steel bodies. In certain applications, the first of these, which forms the inner raceway for the row on the outboard side, is the tubular core itself, as discussed above. It includes a tubular axial portion extending on the inboard side. On this tubular portion is fitted the second annular steel body, known in the industry as "small ring" or "small inner ring". The tubular portion of the first annular steel body has an end portion which protrudes over a lateral or transversal surface of the second annular body. This end portion undergoes a cold deformation, typically by orbital roll forming, in a radially outer direction; a rolled, plastically deformed edge is thus obtained, which axially locks the second annular body and axially preloads the entire bearing unit. It is therefore necessary for the first steel body or core to undergo induction hardening treatment in order to harden only the raceway area. The hardened area must not extend as far as the end portion to be rolled, since this must not become too hard and brittle, but must instead remain suitable for undergoing plastic processing.

Therefore, another object of the invention is to reduce the higher costs associated with the need to carry out traditional thermal hardening treatment by induction.

Hub bearing assemblies have also been developed in which a hub made of a lightweight metallic material, typically an aluminium alloy, forms a central tubular portion around which one or two steel bearing rings are forcibly inserted, with respective radial inner raceways for respective rows of rolling-contact elements. The greater thermal expansion of the aluminium alloy than that of steel causes undesirable changes in the axial preload under operating conditions.

A further specific object of the invention is to produce a hub unit of light material, with integrated bearing rings firmly secured to the lightweight material of the hub, without generating in the latter mechanical stresses or strains which may compromise reliability of the hub unit, especially after prolonged periods of use.

The above and other objects and advantages are achieved, according to the invention, by a hub unit having the characteristics set out in Claim 1. According to another aspect, the invention relates to a method of assembly as defined in Claim 18. Preferred embodiments of the invention are defined in the dependent claims.

BRIEF DESCRIPTION OF DRAWINGS

Certain preferred embodiments of the invention are described below with reference to the accompanying drawings, in which:

FIG. 1 is a partially sectioned perspective view of a hub unit with bearing rings integrated according to a typical embodiment of this invention;

FIG. 2 is a view of an axial section of the unit of FIG. 1;

FIG. 5 is a view in axial section of the sleeve locking device of FIG. 4 mounted on the hub of FIG. 3;

FIG. 6 is a schematic perspective view of the hub with the sleeve device of FIG. 5 during an intermediate stage of the manufacturing process;

FIG. 7 is a view in axial section of the unit of FIG. 2 in a phase of the manufacturing process subsequent to that of FIG. 6;

FIGS. 8 and 9 are perspective views of two further different embodiments of the sleeve locking device;

DETAILED DESCRIPTION OF THE PRESENT INVENTION

Figure 3:
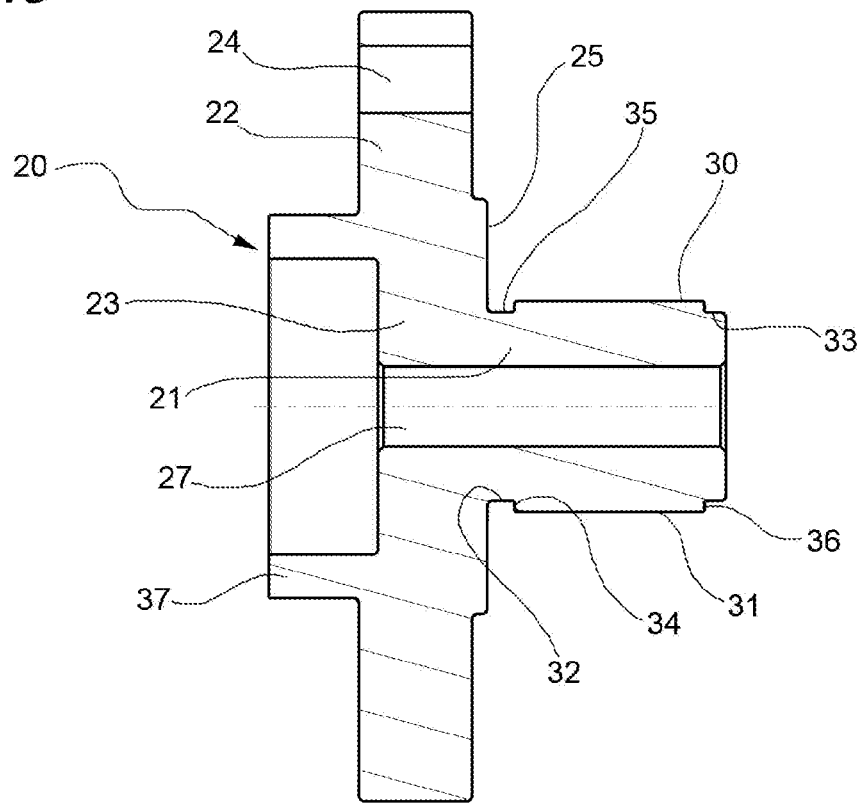
FIG. 3 is a view in axial section of a hub forming part of the unit of FIGS. 1 and 2.

Referring initially to FIGS. 1 and 2, the number 10 indicates as a whole a lightweight hub unit with integrated bearing rings, for a hub bearing assembly of a motor vehicle wheel. The unit 10 defines a central rotation axis x and is designed to rotatably mount a wheel (not shown) of a motor vehicle around the x axis. The hub bearing assembly is not shown here in its entirety. As is known, a hub bearing assembly also includes a stationary outer ring, which is connected in use to an upright of the vehicle suspension (not shown). The hub bearing assembly, of which the hub unit 10 is intended to be part, is a hub bearing assembly of the type having a double-row of rolling-contact elements interposed between the respective inner and outer raceways. For this purpose, the hub unit 10 has two radial inner raceways, indicated by 11, 12, axially spaced one away from the other.

Throughout this description and in the claims, the terms and expressions indicating positions and directions such as for example "radial", "axial", "transverse", are to be understood as referring to the x rotation axis. Expressions such as "axially inner" (or "inboard") and "axially outer" (or "outboard"), on the other hand, refer to the condition mounted on the vehicle.

The unit 10 comprises a hub 20 of lightweight material, preferably an aluminium alloy, for example an alloy chosen from the following: 6061 T6, 6082 T6 or T5, A 356 T6, 43500 T6. Alternatively, the hub 20 can be made of other materials, here defined as "light", which may include, in addition to light metal alloys (such as aluminium, titanium, magnesium, etc. alloys), metal matrix composites, polymers, fibre reinforced polymers.

The hub 20 forms, in a single piece, a cylindrical portion 21 which extends in an axial direction, and a flange 22 which extends in a radially outer direction from the axially outer end 23 of the cylindrical portion 21.

The flange 22 serves to mount a wheel (not shown) of the vehicle. Four/five axial holes 24 are formed in the flange in angularly equidistant positions around the x axis. The holes 24 are suitable to accommodate a corresponding plurality of fixing elements (not shown), for example screws for fixing the wheel. The flange has an axially inner radial surface 25, designed to be directed toward the vehicle while in use, and an axially outer radial face 26, forming a flat support surface for a brake rotor (not shown) and/or for the wheel of the vehicle.

The cylindrical portion 21 serves to support two radially inner bearing rings 14, 15, axially side by side or adjacent to one another. In the embodiments illustrated here, the cylindrical portion 21 is of tubular shape, and has an inner cylindrical cavity 27 extending axially. An axially inner end 28 of the cylindrical portion 21 has a radial terminal surface 29. The inner cavity 27 is pass-through in these embodiments. In other embodiments, depending on the type of wheel to be fitted (i.e. driving or driven), the cavity 27 can be closed. In still other embodiments, the cylindrical portion 21 may be filled internally, i.e. without a cavity 27.

The cylindrical portion 21 has a radially outer surface 30 which forms, in the illustrated example, a radially thickened portion 31, which is spaced axially away from both the flange 22 and from the axially inner end 28, by means of two respective lengths 32 and 33, adjacent to the thickened portion 31 and each having a maximum transversal or radial dimension, which is less than the maximum transversal dimension of the thickened portion 31. In the examples shown here, the thickened portion 31, and the lengths 32 and 33 adjacent to it are made as cylindrical surfaces.

The thickened portion 31 defines a step that has a shoulder surface 34 axially spaced away from and facing the flange 22, more in particular facing the axially inner surface 25 (inboard side) of the flange 22. The shoulder surface 34, in the example illustrated, lies in a plane radial or perpendicular to the rotation axis x, and connects the thickened portion 31 to the length 32 of smaller diameter. A groove or recess 35 (FIG. 3) is formed, in this example it is an annular recess, between the axially inner surface 25 of the flange and the step 34. In a variant not shown, the shoulder surface 34 may be inclined with respect to the rotation axis x, according to a conical surface which tapers in a axially outer direction in order to facilitate the assembly of a sleeve device described later.

Preferably, the thickened portion 31 defines a second step or shoulder surface 36 facing an axially inner direction. The shoulder surface 36, illustrated in the example, lies in a plane radial or perpendicular to the rotation axis x, and connects the thickened portion 31 to the thinner terminal length 33. In a variant not shown, the shoulder surface 365 may be inclined with respect to the rotation axis x, according to a conical surface which tapers in an axially inner direction.

The hub 20 can also form an axial tubular appendage 37 which protrudes from the axially outer side, to facilitate the centering of the wheel.

Figure 4:
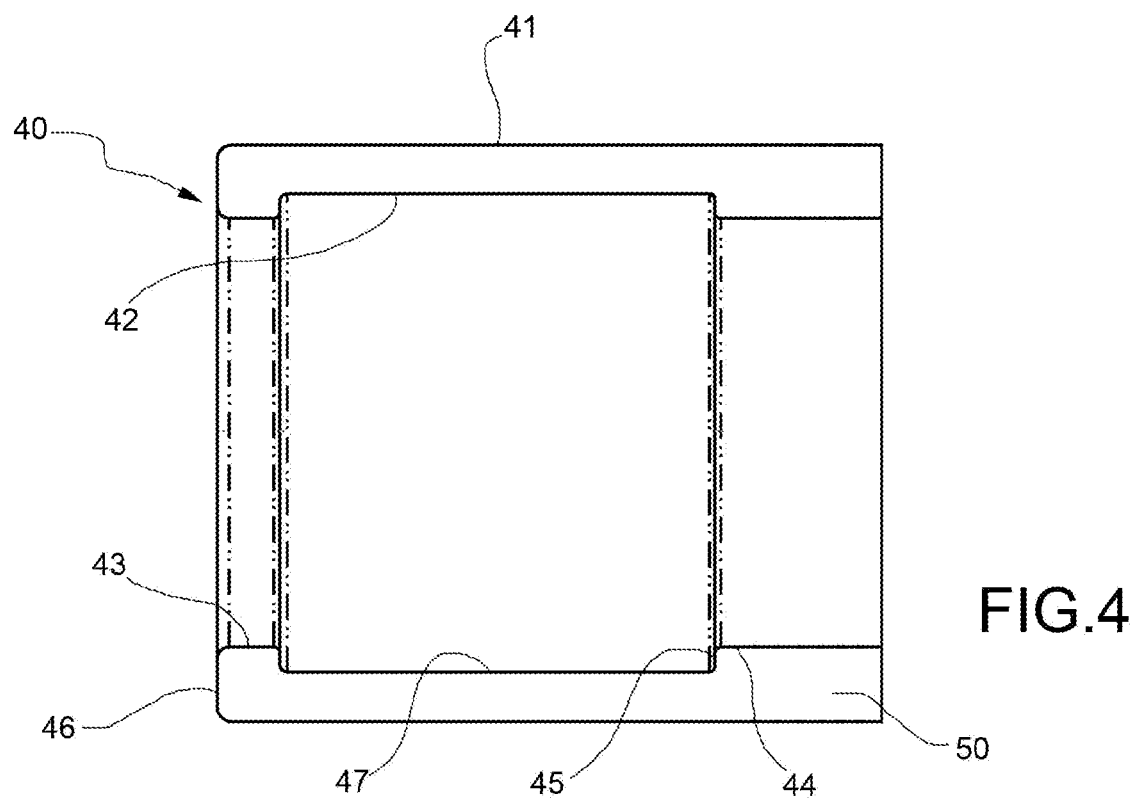
FIG. 4 is a view in axial section of a sleeve locking device forming part of the unit of FIGS. 1 and 2.

On the cylindrical portion 21 of the hub 20 a sleeve locking device 40 of overall cylindrical tubular shape is placed (FIGS. 4 and 5). In one embodiment, the sleeve device 40 has a smooth radially outer cylindrical surface 41 and an inner cylindrical cavity 42. The inner cavity 42 has a profile preferably consistent, when seen in axial section, with the outer profile of the radially outer surface 30 of the cylindrical portion 21 of the hub.

A first protrusion 43 protruding in a radially inner direction is formed at an axially outer end of the sleeve device 40 and engages, preferably without axial play, in the recess or groove 35 between the axially inner surface 25 of the flange and the shoulder surface 34. In the illustrated embodiment, a second protrusion 44 protruding in a radially inner direction is also formed towards the axially inner end of the sleeve device 40 and has a transversal surface 45 axially in abutment against the second radial shoulder surface 36. The protrusions 43 and 44 serve as retaining elements to constrain the sleeve device 40 on the hub 20. As may be seen, the mounting of the sleeve device 40 on the hub 20 does not generate deformations or high tensions in the material forming the hub.

The sleeve device 40 also has a radial terminal surface 46 at one axially outer end, which is in abutment against the axially inner surface 25 of the flange 22. Between the first 43 and the second 44 protrusion, the radially inner surface of the sleeve has a cylindrical portion 47 congruent with the outer cylindrical surface of the thickened portion 31 of the hub 20. As shown in FIG. 5, in a preferred embodiment, the sleeve device has an inner cylindrical cavity having an inner profile congruent, when seen in axial section, with the outer profile of the cylindrical portion 21 of the hub.

In the embodiment of FIGS. 4 and 5, the sleeve device 40 is formed by a single tubular element having a longitudinal or axial cut 48, such that the sleeve device is developed circumferentially as an open ring (FIG. 8). The cut defines two opposing or facing axial or longitudinal edges 49a, 49b.

To apply the sleeve device 40 on the cylindrical portion 21 of the hub 20, the sleeve is opened or retracted in contrast to its elastic force, in other words elastically expanding the sleeve device by mutually distancing the two opposite edges 49a, 49b of the cut 48. The sleeve device is then inserted axially (FIG. 6), in a temporarily broadened condition, around the cylindrical portion 21. In the example illustrated, to open the sleeve device as little as possible, and thus avoid damaging it, the sleeve is applied moving it in the axially outer direction (arrow A, FIG. 6) towards the flange 22, optionally until the sleeve device is in abutment against the flange 22. The sleeve device is then released, allowing the protrusions or retaining portions 43 and 44 of the sleeve device to engage elastically or snap into the radial recesses 35, 33 of the hub. Upon reaching this position (FIG. 5), an axially inner end portion 50 of the sleeve device 40 protrudes beyond the radial terminal surface 29 of the cylindrical portion 21 of the hub 20.

Numerals 14 and 15 indicate the first and the second bearing ring which respectively have the corresponding radial inner raceways 12, 13 for two rows of rolling-contact elements (for example balls or tapered rollers, not shown). The bearing rings 14, 15 are then placed on the outer cylindrical surface 41 of the sleeve 40, initially smooth, bringing the first axially outer inner ring 15 in abutment against the axially inner surface or side 25 of the flange 22. In this condition (FIG. 7), the axially inner end portion 50 of the sleeve 40 protrudes axially beyond a radial surface or end face 16 presented by the second ring being axially innermost 14 facing in an axially inner direction.

The end portion of the sleeve then undergoes a cold deformation, typically by orbital roll forming, in a radially outer direction, thus obtaining a rolled, plastically deformed edge 17, which axially locks both bearing rings 14 and 15 in an axially preloaded condition of the hub 20 (FIG. 2).

Those skilled in the art will recognise that the roll forming operation is actually carried out after a series of steps that are here omitted and not shown since they are unnecessary for understanding the invention. It will suffice to mention here that prior to the roll forming of the terminal edge of the sleeve, it is necessary to preliminarily position a row of rolling elements on the axially outer side or outboard side, then apply a radially outer bearing ring, then insert a row of rolling elements from the axially inner side or inboard side, and finally perform the orbital roll forming.

Due to the roll forming of the sleeve 40, coupled by form coupling on the light material hub, the bearing rings 14, 15 remain firmly locked on the hub 20 both axially and circumferentially or rotationally.

By virtue of the thickened portion 31, axially forced between the protrusions 43 and 44, a thermal expansion of the material forming the hub 20, greater than the thermal expansion of the steel of the sleeve 40, further increases the effect of the sleeve locking device 40 on the hub, avoiding related movements between these two bodies. Conversely, a thermal contraction resulting from a temperature reduction, involves a greater axial clamping of the protrusion 43 of the sleeve, axially clamped between the flange 22 and the shoulder surface 34.

The embodiment so far described has the advantage of having a single discontinuity line in the sleeve. A reduction of discontinuity in fact reduces the chances of the orbital roll forming being defective at the junction between the longitudinal edges or the axially opposing edges 49a, 49b, separated by the cut 48. As known, the material subject to roll forming tends to expand, smearing over the surface against which it is plastically crushed. Experimental tests carried out by the Applicant have shown that if the angular extension of the sleeve 40 is slightly less than 360°, the possibility of producing defects in the rolled edge, particularly in the area of the junction between the opposite ends of the arc, is reduced.

In yet a further different embodiment (FIG. 9), the cut 48 may extend only partially through the sleeve device, for example starting from an axially outer end 51, but not extend to the axially inner end 52, which therefore is circumferentially continuous, according to a closed ring, and does not have any discontinuity. In this way, the cut 48 facilitates the positioning of the sleeve device 40 around the cylindrical portion 21 of the hub, because it allows the sleeve device 40 to expand elastically in the radial direction from the axially outer side (facing towards the outboard side). At the same time, the sleeve device has no discontinuities or interruptions in the axially inner end of the sleeve, which is subsequently subjected to orbital roll forming or other equivalent plastic deformation to form the terminal edge that axially preloads the bearing rings and the hub. The absence of discontinuities along the end 52 of the sleeve device subject to orbital roll forming reduces the risk of defects in the final rolled edge 17. In still another different embodiment (not shown), there may be two or more longitudinal cuts similar to the cut indicated by 48 in FIG. 9 that are angularly spaced. These cuts may extend only partially through and along the sleeve device, for example starting from the axially outer end 51 but without extending to the axially inner end 52, which therefore is circumferentially continuous.

Figure 10:
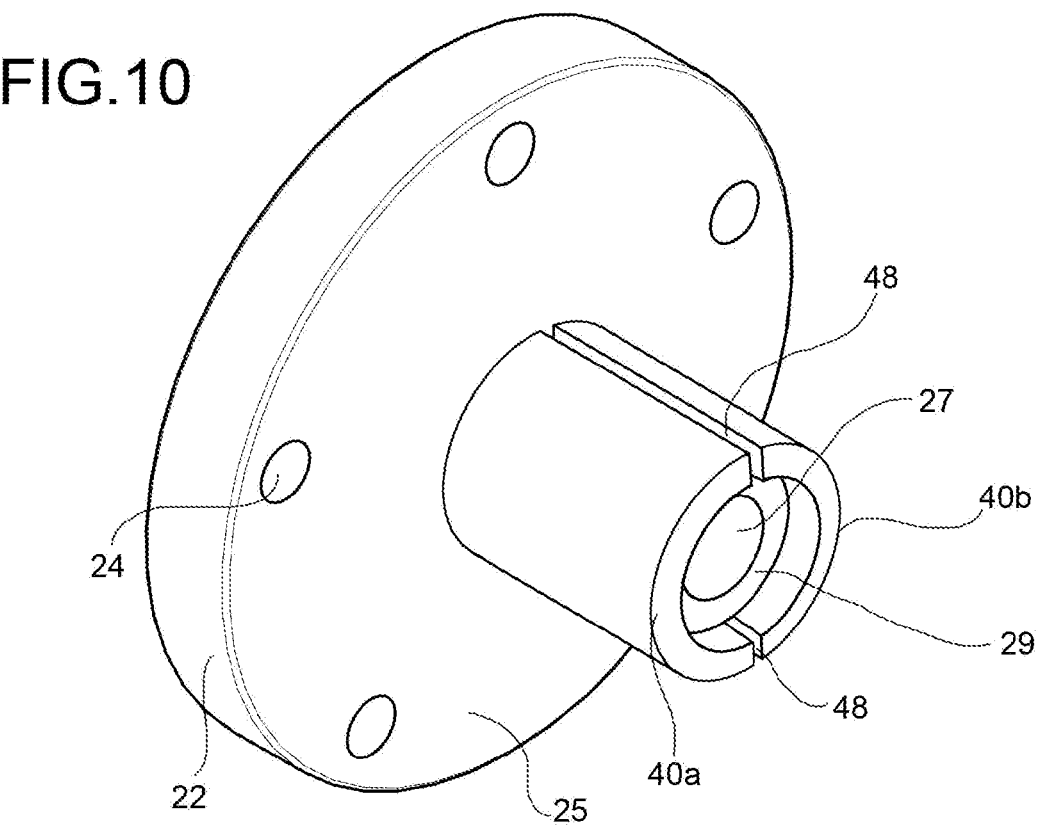
FIG. 10 is a schematic perspective view of a hub with a sleeve device different from those of the preceding figures.

According to the embodiment shown in FIG. 10, the sleeve 40 can be made by two complementary parts or elements, preferably shaped as two half-sleeves or sleeve segments 40a, 40b that extend according to explementary arcs, i.e. according to angular extensions which, if added together, complete a circumference of 360° around the cylindrical portion 21 of the hub. In a particularly advantageous embodiment, the two half-sleeves 40a, 40b are identical and each have an angular extension of about 180° or slightly less than 180°. Optionally, the angular extension of each or one of two half-sleeves can be slightly less than 180°, so that the two half-sleeves combined together present an arc slightly smaller than 360° to reduce defects during the roll forming process.

The two half-sleeves 40a, 40b do not differ substantially from the sleeve 40 described above with reference to FIG. 4, to which reference is made again. Each half-sleeve has a first protrusion 43 projecting in a radially inner direction, which can be formed at one axially outer end of the sleeve 40 to engage without axial play, in the groove or radial recess 35 between the surface 25 of the flange and the shoulder surface 34 of the hub. A second protrusion 44 projecting in a radially inner direction can be formed toward the axially inner end of each half-sleeve 40a, 40b and can have a transversal surface 45 which stands axially against the second radial shoulder surface 35. Each half-sleeve can also have a radial terminal surface 46 at one of its axially outer ends, which is in abutment against the axially inner surface 25 of the flange 22. Between the first and the second protrusion 43, 44, the radially inner surface of each half-sleeve 40a, 40b may present a cylindrical portion 47 congruent with one part of the outer cylindrical surface of the thickened portion 31 of the hub 20.

Assembly of the flanged ring differs from the process previously described only in the fact that, to apply the sleeve device of FIG. 10 on the cylindrical portion 21 of the hub 20, the two half-sleeves 40a, 40b are simply applied around the cylindrical portion 21, causing the engagement of their respective protrusions 43 and 44 in the recesses 35 and 33. In this condition, an axially inner end portion 50 of the two half-sleeves 40a, 40b protrudes beyond the radial terminal surface 29 of the cylindrical portion 21 of the hub 20. In the embodiment of FIG. 10, the sleeve device 40 assembled has two diametrically opposed longitudinal cuts or discontinuities 48.

Then the two bearing rings 14, 15 which have respective radially inner raceways for the respective rows of rolling-contact elements are applied around the two half-sleeves.

Preferably, the sleeve device 40 or the half-sleeves 40a, 40b that may comprise it are made of bearing steel, for example G55 or G70 steel, which have good mechanical workability, and particularly ductility, characteristics.

Figure 11:
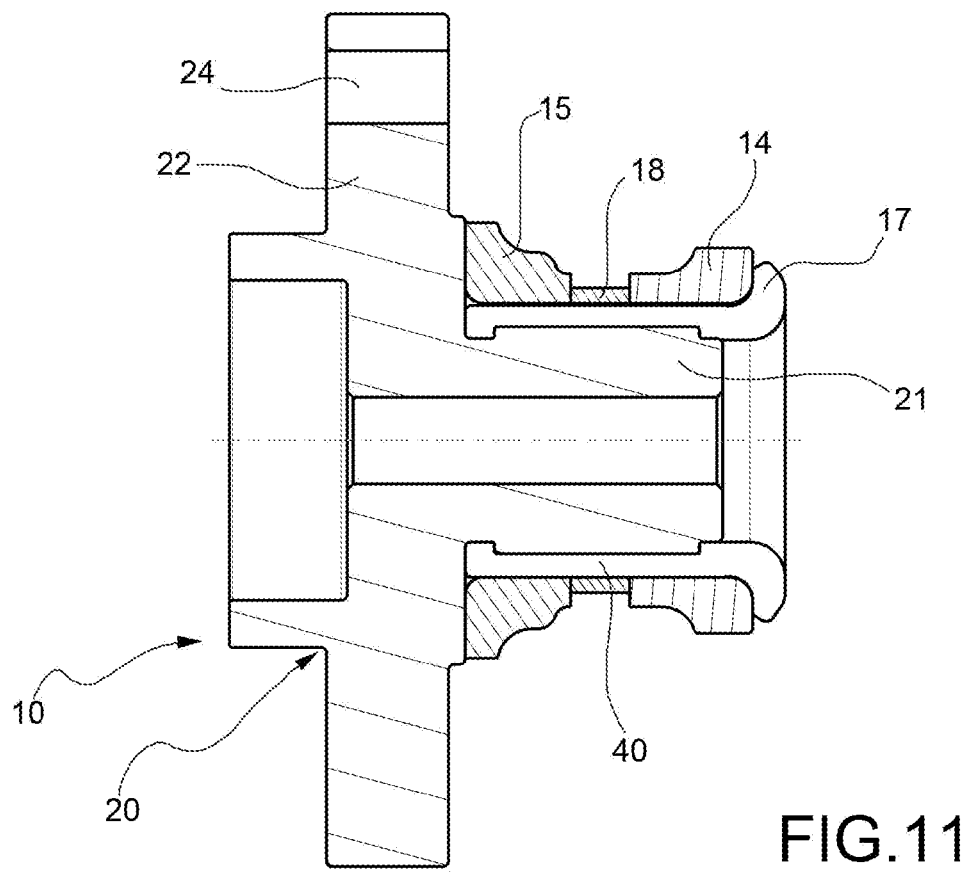
FIGS. 11 and 12 are two views in axial section of the hub unit according to two further still different embodiments.

In the embodiment of FIG. 11, an annular spacer 18 is axially interposed between the bearing rings 14 and 15.

Figure 12:
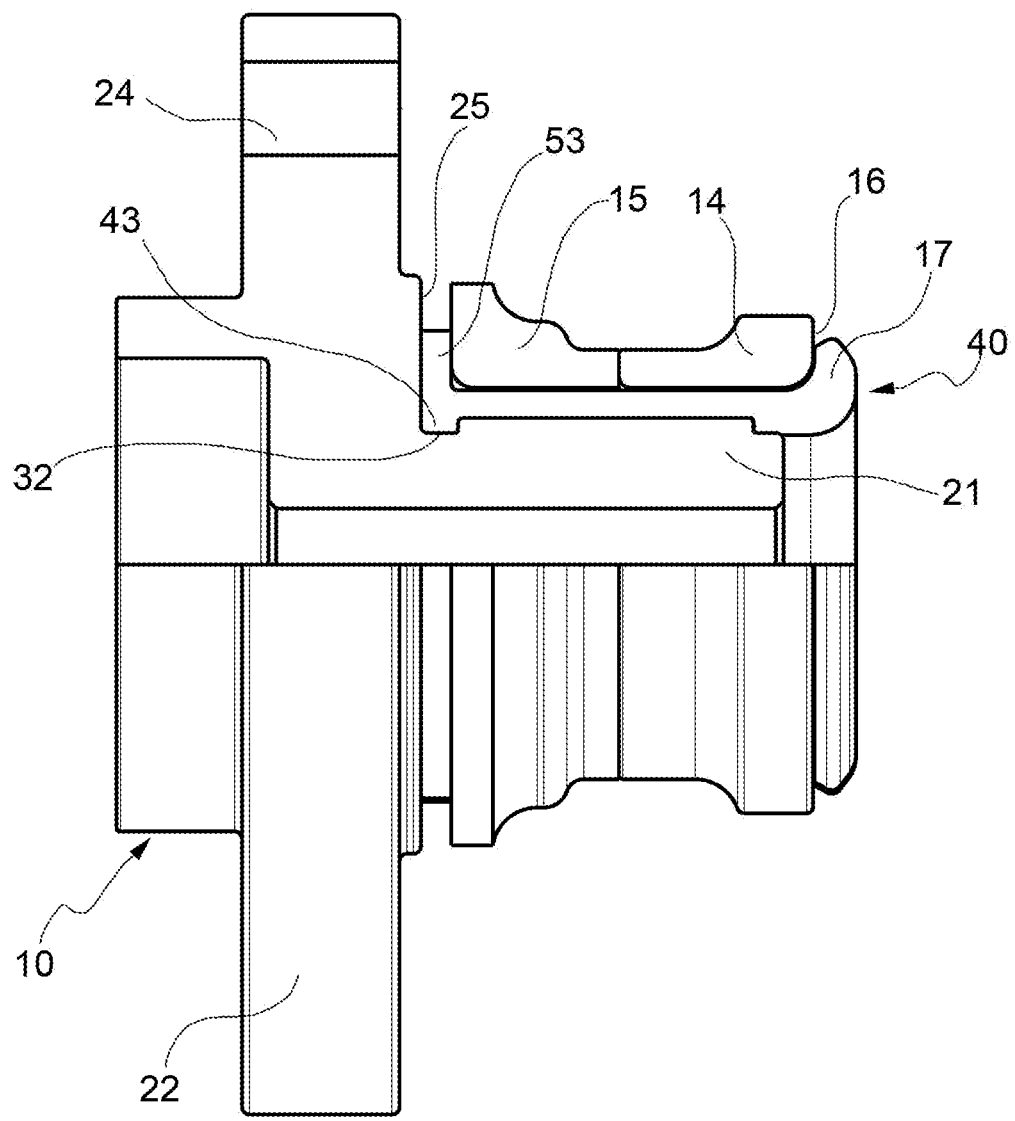

In the embodiment of FIG. 12, a flange 53 extends in a radially outer direction from the axially outer end of the sleeve device 40 and is axially interposed between the flange 22 of the hub and the axially outer bearing ring 15. This embodiment offers the additional advantage of providing a steel-to-steel interface also on the outboard side (axially outer) of the bearing rings which allows a better maintenance of the axial preload over time.

Although some exemplary embodiments were illustrated in the detailed description above, it should be considered that a large variety of hub units could be configured differently from what was shown and described, for example as regards the shape and location of the surfaces which carry out the form coupling between the hub and the sleeve or half-sleeves. Various aspects and embodiments of the invention have been described. It is understood that each embodiment can be combined with any other embodiment. Moreover, the invention is not limited to the embodiments described but may be varied within the scope defined in the appended claims and their legal equivalents.

What is claimed is:

1. A hub unit with integrated bearing rings, the unit comprising:
   a single-piece hub made of a first material and including:
   a cylindrical portion extending in an axial direction,
   a flange extending in a radially outwardly direction from an axially outer end of the cylindrical portion, and
   at least one radial recess having a surface facing the flange;
   a first and a second bearing ring, made of a second material different from the first material, the bearing rings being mounted around the cylindrical portion in axial alignment, wherein the second bearing ring is axially inner with respect to the first bearing ring and provides an end face facing an axially inner direction;
   a sleeve locking device, radially interposed between the cylindrical portion of the hub and said first and second bearing rings, the sleeve locking device including:
   at least one retaining portion projecting in a radially inward direction and engaged in the radial recess of the hub,
   an axially inner end edge plastically deformed in a radially outer direction against the end face of the second bearing ring, and
   at least one cut extending radially through and axially along the locking sleeve device.

2. The hub unit according to claim 1, wherein the sleeve locking device comprises a single tubular element and said cut is located in the sleeve.

3. The hub unit according to claim 2, wherein the sleeve locking device includes first and second opposite axial ends, and said cut extends along the entire sleeve locking device from the first axial end to the second axial end, whereby the sleeve locking device is configured as an open loop.

4. The hub unit according to claim 2, wherein the sleeve locking device includes first and second opposite axial ends, and said cut extends from the first axial end without reaching the second axial end, whereby the second axial end is circumferentially continuous.

5. The hub unit according to claim 1, wherein the sleeve locking device includes first and second opposite axial ends, and further includes a second cut which extends from the first axial end without reaching the second axial end.

6. The hub unit according to claim 1, wherein the sleeve locking device includes first and second opposite axial ends, and, the at least one cut includes a first cut and a second cut which extend axially along the locking sleeve device, and wherein the first cut and the second cut extend from the first axial end to the second axial end, whereby the sleeve locking device is made in two parts that together extend as arcs around the cylindrical portion of the hub.

7. The hub unit according to claim 6, wherein the two parts composing the sleeve locking device are shaped as semi-sleeves each having an angular extension of 180° or slightly less than 180°.

8. The hub unit according to claim 1, wherein the first material which made the hub is made of is a material selected from: aluminum, aluminum alloys, metal matrix composites, polymers, fiber reinforced polymers, carbon fiber reinforced resin.

9. The hub unit according to claim 1, wherein the second material which the bearing rings are made of is a bearing grade steel or a ceramic material.

10. The hub unit according to claim 1, wherein the sleeve locking device is made of steel.

11. The hub unit according to claim 10, wherein the sleeve locking device is made of a bearing grade steel.

12. The hub unit according to claim 10, wherein the sleeve locking device is made of G55 or G70 stainless steel.

13. The hub unit according to claim 1, wherein the cylindrical portion of the hub provides a radially outer surface having a radially thickened portion which is axially spaced from the flange by the radial recess having the surface facing said flange.

14. The hub unit according to claim 13, wherein the cylindrical portion has a radial end face at one axially inner end, and wherein the radially thickened portion is axially spaced from the axially inner end by a second radial recess having a surface facing away from the flange.

15. The hub unit according to claim 1, wherein the sleeve locking device provides an inner cylindrical cavity having a profile which is congruent, when seen in an axial cross-section, to an outer contour of the cylindrical portion of the hub.

16. The hub unit according to claim 1, wherein the sleeve locking device is coupled by form coupling or geometric coupling with the cylindrical portion of the hub.

17. The hub unit according to claim 1, wherein the sleeve locking device forms a flange which extends radially outwardly from an axially outer end of the sleeve locking device, and wherein the flange of the sleeve locking device is axially interposed and clamped between the flange of the hub and the first bearing ring.

18. A method of manufacturing a hub with integrated bearing rings, the method comprising the steps of:
  a1) providing a hub, made of a first material, which forms, as a single piece:
    a cylindrical portion extending in an axial direction,
    a flange extending in a radially outward direction from the axially outer end of the cylindrical portion, and
    at least one radial recess having a surface facing the flange;
  a2) providing a sleeve locking device comprising:
    an outer cylindrical surface,
    at least one retaining portion projecting in a radially inward direction, and at least a first cut which extends axially along the sleeve locking device;
  b) fitting the sleeve locking device around the cylindrical portion of the hub, causing the retaining portion to engage in the radial recess of the hub,
  c) fitting a first and a second bearing ring, made of a second material different from the first material, axially aligned around the outer cylindrical surface of the sleeve locking device, so that the second ring is axially inner of the first ring and provides an end face facing an axially inner direction;
  d) plastically deforming an inner end of the sleeve locking device in a radially outer direction against the end face of the second bearing ring, so as to form a plastically deformed edge which axially locks and preloads the first and second bearing rings towards the flange of the hub.

19. The method of claim 18, wherein the fitting step b) includes the step of b1) elastically widening the locking device by mutually moving away or divaricating two opposite edges of the cut.

20. The method of claim 19, wherein the widening step b1) is followed by the step of fitting the elastically expanded sleeve locking device, moving it in an axially outer direction towards the flange, and then releasing the sleeve locking device to allow the retaining portion of the sleeve locking device to engage the radial recess of the hub.

21. The method of claim 18, wherein step a2) of providing a sleeve locking device comprises the step of preliminarily providing two sleeve parts or segments which together extend as substantially explementary arcs so as to define the sleeve locking device, wherein each part or segment provides
  an outer surface that defines part of the outer cylindrical surface and at least one retaining portion projecting radially inwardly, and wherein the step b) of fitting the sleeve locking device around the cylindrical portion of the hub comprises the step of
  moving the two parts or segments of the sleeve locking device radially closer to one another so as to cause the respective holding portions to engage the radial recess of the hub.

* * * * *